United States Patent [19]

Toomey

[11] 3,953,574

[45] Apr. 27, 1976

[54] PROCESS FOR PURIFYING MOLTEN MAGNESIUM CHLORIDE

[75] Inventor: Robert D. Toomey, Salt Lake City, Utah

[73] Assignee: N L Industries, Inc., New York, N.Y.

[22] Filed: Nov. 25, 1974

[21] Appl. No.: 526,838

[52] U.S. Cl................................ 423/178; 423/498; 204/70
[51] Int. Cl.² ..................... C01F 5/32; C01F 5/30; C25C 3/04
[58] Field of Search..................... 423/498, 497, 178

[56] References Cited
UNITED STATES PATENTS
3,067,006  12/1962  Ebert et al. .......................... 423/178
3,512,928   5/1970  Lyons et al. ......................... 423/178

OTHER PUBLICATIONS

Chem. Abstracts, Vol. 52, 1958, pp. 14992 and 14993.
Chem. Abstracts, Vol. 43, 1949, p. 7201.

*Primary Examiner*—Edward Stern

[57] ABSTRACT

Spray-dried magnesium chloride salt containing minor amounts of impurities in the form of oxygen containing compounds including metal oxides and in particular particulate magnesium oxide, hydroxyl groups, and the like, is purified by forming a molten bath of said magnesium chloride salt and chlorinating the molten salt in the presence of carbon and an iron chloride complex.

5 Claims, No Drawings

PROCESS FOR PURIFYING MOLTEN MAGNESIUM CHLORIDE

BACKGROUND OF THE INVENTION

A source material commonly used for the electrolytic production of magnesium metal is a spray-dried magnesium chloride salt derived from sea water, inland salt lakes, salt wells, and the like. This spray-dried magnesium salt will comprise magnesium chloride, as a major portion, plus magnesium chloride complexes containing one or more hydroxyl groups, significant amounts of particulate MgO and trace amounts of other oxides and/or metals such as sodium, potassium, calcium, chromium, manganese and nickel; and while the presence of the latter metals in the spray-dried magnesium salt has no significant deleterious effect on the quality of the magnesium metal produced electrolytically from the fused salt, it is essential that any oxygen containing compounds, hydroxyl groups and the like be substantially completely removed-for otherwise they will interfere with the reactions at the electrodes at temperatures prevailing in the cell thereby reducing current efficiencies, shortening cell life and causing difficulties attending recovery of the magnesium metal from the cell.

Several methods have been employed heretofore for purifying spray-dried magnesium chloride using chlorine to chlorinate and/or dissipate any oxygen containing compounds including hydroxyl groups so that the purified salt may be used as an electrolyte in the electrolytic production of magnesium metal.

U. S. Pat. No. 3,484,191, describes a process for purifying hygroscopic magnesium chloride salts derived from ocean water, inland seas, salt lakes, and similar sources, by treating the impure magnesium chloride, in a fused state, with a sulfur chloride compound such as sulfur monochloride, sulfur dichloride, or sulfur tetrachloride, wherein the sulfur combines with any oxygen containing compounds present in the fused magnesium chloride to form sulfur dioxide gas while the liberated chlorine reacts with any magnesium oxide present to form magnesium chloride.

U. S. Pat. No. 3,512,928, is similarly directed to a process for purifying hygroscopic magnesium chloride salts so as to eliminate soluble and reactibe oxygen containing compounds therefrom, wherein activated carbon, or carbon bearing materials which produce activated carbon are introduced into a bath of the fused magnesium chloride and react, selectively, with any sulfates or soluble and reactive oxygen bearing compounds in the fused salt bath to dissipate said compounds in the form of gaseous CO, $H_2O$, $CO_2$, $CO_2$, $SO_2$, and the like.

Although the methods disclosed in the prior art have had some measure of success, the economics of producing electrolytic magnesium metal, using a spray-dried magnesium chloride source material, are extremely demanding and hence, efforts are constantly being made to achieve more efficient and economical methods for purifying a spray-dried magnesium chloride source material.

SUMMARY OF THE INVENTION

The present invention is the discovery of a rapid, economical, highly efficient process, adapted to large scale plant operations for purifying a spray-dried magnesium chloride salt such that the purified molten magnesium chloride may be used as an electrolyte in the production of substantially pure magnesium metal at high current efficiencies attended by long cell life; the process being characterized by fusing the spray-dried magnesium chloride salt, and bubbling chlorine gas therethrough, preferably in successive stages, in the presence of carbon and an iron-chloride complex until the level of impurities in the melt, as measured by percent MgO is at least as low as 0.3%. The chlorine gas used to chlorinate the fused salt may be derived from an electrolytic cell in which magnesium metal is being produced from a purified molten magnesium chloride. The iron-chloride complex is preferably formed in situ in said molten salt by reaction of gaseous chlorine with powedered metallic iron or iron oxide added to the molten salt, the iron of the iron-chloride complex being in the ferrous state. Alternatively, the iron-chloride complex may be formed externally and added directly to the molten salt or to the spray dried material used in preparing the salt melt. It is essential moreover that the amount of iron as iron-chloride complex be maintained in the molten salt at a level of at least 0.5% iron as Fe to insure maximum removal of magnesium oxide and optimum chlorination efficiencies.

PREFERRED EMBODIMENT OF INVENTION

In general, the process of this invention is carried out by charging spray-dried magnesium chloride salt into a melt cell or furnace sealed from the atmosphere; adding a reductant i.e. carbon plus powdered metallic iron, or iron oxide, heating the salt to melt temperatures between 1400–1600°F by passing alternating current between spaced carbon electrodes mounted in the cell, and bubbling gaseous chlorine into the melt while adding additional metallic iron, if necessary, to maintain the amount of iron, as a ferrous iron-chloride complex present in the salt bath, at a level of at least about 0.5% iron as Fe and preferably from 0.75% to about 2.0% by weight of said molten salt. An atmosphere of nitrogen or other inert gas may be maintained in the cell to insure against the presence of oxygen.

As pointed out above, the spray-dried magnesium chloride salt comprises mainly magnesium chloride combined with and/or including other metallic compounds containing inorganic radicals such as oxides, hydroxides and the like and in particular fine particles of magnesium oxide. Earlier attempts to chlorinate the particulate MgO by adding gaseous chlorine to the fused salt were inefficient due to the relatively poor reaction between the gaseous chlorine and solid MgO. It has now been discovered that by having present in the molten salt a minimum percentage of a ferrous iron-chloride complex a mechanism is provided for chlorination of the magnesium oxide quickly and efficiently. Thus when gaseous chlorine is introduced into the molten salt in the presence of metallic iron a ferrous iron-chloride complex is formed which is rapidly oxidized by additional chlorine to form a ferric-chloride complex. The latter is highly soluble in the molten salt and also chemically unstable and as a consequence provides good contact and reacts rapidly with the magnesium oxide to form magnesium chloride plus additional ferrous iron chloride. The newly formed ferrous iron chloride will then react with additional chlorine gas to continue the chain of reaction which characterizes the chlorination mechanism of this invention-until the melt is substantially purified that is to say until the level of magnesium oxide is no more than about 0.3% and preferably lower. While the composition of the iron-chloride complex is not definitely known it is presumably the reaction product of chlorine and iron with trace amounts of other metal and/or non-metal components in the salt melt.

As a consequence it is now possible to chlorinate spray-dried magnesium chloride salts in a manner to produce substantially pure molten magnesium chloride rapidly and at chlorination efficiencies of at least 90% to as high as 98% thus satisfying the stringent economic requirements of commercial operations.

Concerning the iron used, this may be in the form of metallic iron powder or iron oxide, and may be admixed with the spray-dried magnesium chloride salt prior to melting or added separately to the salt melt. Moreover, it has been found essential to high chlorination efficiencies that at least about 0.5% iron in the iron-chloride complex be maintained in the fused salt during chlorination, preferred amounts being in the range from 0.75 to about 2.0%. While amounts above 2.5% are equally effecitve they are less desirable in that excess iron must be removed from the purified melt prior to electrolysis. Further, when the amount of iron drops below about 0.5% chlorine efficiencies are sharply reduced. Thus it is essential that during chlorination the iron values in the fused salt be monitored and that iron be added, when necessary, so as to maintain at least the minimal iron requirements in the melt during chlorination.

As pointed out above a reductant in the form of finely divided carbon is also added to the molten salt bath to react with any released oxygen in the melt. The carbon is preferably in a highly reactive form, such as a calcined petroleum coke, and may be added directly to the spray-dried magnesium chloride melt; or may be admixed with the spray-dried magnesium salt and iron prior to or simultaneously with the addition of the mixture to the melt cell, the amount of carbon added being at least sufficient to react with all of the oxygen introduced in the melt as metal oxides, hydroxyl groups and the like.

Chlorination is preferably carried out by bubbling chlorine gas into the molten $MgCl_2$ from the bottom of the melt using graphite lances emersed in the melt. Concerning the chlorine gas, the present invention embraces the concept of utilizing the free chlorine evolved in an electrolytic cell used in the production of magnesium metal, as well as chlorine from other sources.

While chlorination of the spray-dried magnesium chloride salt may be carried out in a single stage it has been found that high chlorination efficiencies are achieved only at the cost of relatively high levels of iron in the purified melt which, as pointed out above is undesirable in as much as the iron interferes with the reactions in the electrolytic cells by reducing current efficiencies and shortening cell life.

It has now been discovered, however, that by using a multistage process high overall chlorination efficiencies may be achieved with acceptable low levels of iron in the purified salt melt.

Thus a preferred embodiment of the invention is a continuous, multi-stage, chlorination process characterized by three successive chlorination stages wherein a major portion of the MgO is removed from the molten $MgCl_2$ salt in the first stage and minor amounts in the two succeeding stages whereby residual MgO in the final or purified melt is decreased to as low as 0.3% or less and with no more than about 0.4% residual iron. The three stages may be carried out in separate cells or in one or more compartmentalized cells, and the individual cells or compartments may have the same volume but are preferably of different volume in the interest of maximum chlorination efficiencies. In order to provide uniform chlorine dispersion in the melt and good melt agitation a plurality of both deep and shallow lances may be used for feeding the chlorine into each cell.

More particularly in the interest of chlorinating a major portion of the MgO in the molten salt in the first cell at optimum efficiencies substantially all the iron and carbon are added to the $MgCl_2$ salt in the first cell and the salt heated to a temperature of from 1400 –1600°F preferred range being 1450–1550°F. Chlorine is fed to the melt at a relatively high rate under which operating conditions chlorinating efficiencies of the first cell may approach 100%. The partially chlorinated melt in the first cell is then fed to succeeding cells or compartments without further addition of iron or carbon, and chlorine is fed to the succeeding cells or compartments at lower rates until most of the residual MgO is converted to $MgCl_2$ and the level of iron reduced to acceptable levels. The overall chlorination efficiencies of the multi-stage process have been found to range from 90 to almost 100%.

The following examples will further illustrate the continuous chlorination process of this invention:

EXAMPLE I 595,000 pounds of spray-dried magnesium chloride were fed at the rate of 8,800 pounds per hour into the first cell of a two cell, three compartment process train. The salt average analysis was 68.6% $MgCl_2$, 3.3% MgO, 5.7% $H_2O$ and small amounts of other chlorides such as sodium, potassium, calcium and lithium. The cell was closed from the atmosphere. The salt was heated to a temperature of from 1400 to 1600°F to form a fused salt bath.

Powdered carbon was added to the fused salt in an amount totaling 3.0% by weight of the fused salt and powdered iron in the amount of 2.0% by weight of the salt. Gaseous chlorine free of oxygen was bubbled through the fused salt at an average rate of 170 SCFM. The salt over flowed into the second cell after an average retention time in the first cell of 15 hours. Approximately 91% of the MgO had been chlorinated to $MgCl_2$ in the first chamber; about 58.5% of the iron was dissipated from the salt as gaseous ferric chloride and about 64.9% of the carbon had reacted with the oxygen in the fused salt. Chlorination efficiency in the first compartment was about 94%.

The fused salt from the first compartment analyzed about 78.7% $MgCl_2$, 0.9% Fe and 0.8% carbon. This salt was then chlorinated in the second compartment by bubbling chlorine gas there through at the rate of about 22 SCFM while maintaining substantially the same operating conditions as used in the first compartment. Analysis of the fused salt showed a net decrease of about 0.5% of the MgO remaining in the salt from the first compartment; about 9.6% of the iron was converted to gaseous ferric chloride and left the fused salt bath, and about 2.8% of the carbon had reacted with the remaining oxygen. Chlorination efficiency of the second compartment was about 52% and the fused salt now analyzed about 80.7% $MgCl_2$, 0.4% MgO.

This fused salt was then transferred to a third compartment in which it was chlorinated by bubbling chlorine gas there through at the rate of about 21 SCFM. An analysis of the fused bath showed that about 17.0% of the residual MgO in the salt had been converted to magnesium chloride and that about 5.2% of the residual carbon had been dissipated as oxides of CO, $CO_2$ and the like. Chlorination efficiency of the third compartment was about 17% and the fused salt now analyzed about 80.8% $MgCl_2$; 0.35% MgO, 0.5% Fe and 0.4% C. The fused salt was substantially free of oxygen impurities and as such, was ideally suited for use as an electrolyte in the electrolyte production of magnesium metal.

The overall chlorination efficiency was 91.0%.

EXAMPLE II III

Two additional plant scale runs were made using the procedure described in Example 1 above, but with variations in the chlorine feed rates, salt compositions and additions of carbon and iron. Specific operating conditions and results are shown in the table below:

| Process Controls | EXAMPLE II | EXAMPLE III |
|---|---|---|
| Pounds Spray Dry Feed | 541,900 | 551,700 |
| Lbs/Hr Feed Rate | 7,600 | 7,000 |
| % $MgCl_2$ Spray Dry | 71.3 | 76.3 |
| % MgO Spray Dry | 3.1 | 4.8 |
| % $H_2O$ Spray Dry | 5.5 | 4.7 |
| % Carbon Added | 3.5 | 2.9 |
| % Iron Added | 1.8 | 2.1 |
| $Cl_2$ Rate SCFM | 175 | 130 |
| Ave. Retention Time (1st Cell) | 17.8 | 19.3 |
| % MgO Chlorinated 1st Cell | 92.7 | 92.7 |
| % Iron Lost 1st Cell | 57.9 | 36.3 |
| % C Reacted 1st Cell | 54.8 | 82.5 |
| $Cl_2$ Efficiency | 96 | 93 |
| 1st Cell Production, %$MgCl_2$ | 79.7 | 83.4 |
| 1st Cell Production, %MgO | 0.5 | 0.8 |
| 1st Cell Production, %Fe | 0.8 | 1.1 |
| 1st Cell Production, %C | 0.5 | 0.9 |
| $Cl_2$ Rate SCFM 2nd Comp. | 34 | 30 |
| % MgO Remaining, Converted 2nd Comp. | 0.1 | 0.4 |
| % Iron Lost, 2nd Comp. | 10.1 | 33.7 |
| % Carbon Lost | 0.8 | 4.8 |
| Chlorine Efficiency, 2nd Comp. % | 15 | 17 |
| 2nd Comp. Product, %$MgCl_2$ | 80.2 | 84.4 |
| 2nd Comp. Product, %MgO | 0.4 | 0.52 |
| 2nd Comp. Product, %Fe | — | — |
| 2nd Comp. Product, %C | — | — |
| 3rd Comp. $Cl_2$ Rate SCFM | 21 | 26 |
| % MgO Converted, 3rd Comp. | 0.1 | 0.1 |
| % C Lost | 1.1 | 0.4 |
| $Cl_2$ Efficiency, 3rd Comp. | 20 | 2 |
| 3rd Cell Product, %$MgCl_2$ | 80.2 | 84.3 |
| 3rd Cell Product, %MgO | 0.3 | 0.4 |
| 3rd Cell Product, Fe | 0.4 | 0.5 |
| 3rd Cell Product, C | 0.65 | 0.8 |
| Overall $Cl_2$ Efficiency | 91 | 87 |

EXAMPLE IV

For comparison a series of chloriantion runs were made without benefit of iron additons. 1,000 gram samples of spray-dried magnesium chloride salt were used which salts analyzed from 84–90% $MgCl_2$, from 5–7% MgO, and from 0.5 – 2.0% $H_2O$. From 1 3% finely divided carbon was added to each sample. No iron was added. The salts were heated 1700°F and chlorine was fed to the resulting salts at the rate of from 0.3–0.5 grams per minute. Throughout the runs chlorine efficiencies averaged only about 42% and the percent MgO chlorinated was extremely erratic and generally far below the levels required for a $MgCl_2$ electrolyte.

The instant invention thus provides an efficient process for removing metal oxides and hydroxide values from a spray-dried magnesium chloride salt by heating the salt to molten temperatures and chlorinating the molten salt in the presence of an iron chloride complex and carbon the amount of iron as said iron-chloride complex being continuously maintained in the melt at a level of at least 0.5% iron as Fe and preferably at a level from 0.75 to 2.0%, the process being preferably carried out in successive stages wherein a major portion of the metal oxides i.e. MgO is removed in the first stage and a substantial portion of the residual MgO removed in the subsequent stages whereby overall chlorination efficiencies are achieved in the range from 90–95%.

The invention may be carried out in other specific ways than these herein setforth without departing from the spirit and essential characteristics of the invention and the present embodiment is therefore to be considered al illustrative and not restrictive and all changes coming within the meaning and equivalency range of the appended claims are intended to be embraced therein.

I claim:

1. Method for chlorinating a spray-dried magnesium chloride salt containing metal oxides, hydroxyl groups and other oxidic contaminants to remove oxygen from said salt comprising: heating the salt in a melt cell to form a molten salt and chlorinating said molten salt in said cell in the presence of finely divided carbon and iron, said chlorination being effected by bubbling chlorine through said molten salt to form, initially, a ferrous iron chloride complex which is rapidly oxidized by additional chlorine to form a ferric iron chloride complex in said molten salt, and maintaining the amount of said ferric iron chloride complex in said molten salt at a level substantially equivalent to at least 0.5% iron, as Fe, on salt weight basis, until said molten salt is substantially free of oxygen content.

2. Continuous process for chlorinating spray-dried magnesium chloride salt containing metal oxides, hydroxyl groups and other oxidic contaminants to remove oxygen from said salt, the continuous chlorination of said salt being done in successive stages comprising: heating said salt in a melt cell to a temperature in the range from 1400 to 1600°F. to form a molten salt and partially chlorinating the molten salt in said melt cell in a first chlorination stage by passing chlorine therethrough in the presence of finely divided carbon and iron, said carbon present in an amount to combine with substantially all of the oxygen in said molten salt, said partial chlorination being effected by bubbling chlorine through said molten salt to form initially a ferrous iron chloride complex which is rapidly oxidized by additional chlorine to form a ferric iron-chloride complex in said molten salt, maintaining the amount of said ferric iron chloride complex in said molten salt at a level substantially equivalent to at least 0.5% to as high as 2.0% iron as Fe, on salt weight basis by periodically adding finely divided metallic iron to said molten salt throughout the first stage chlorination, and continuing the chlorination of the partially chlorinated molten salt in successive stages by bubbling additional chlorine therethrough and without adding additional iron to said molten salt, until said molten salt is substantially free of oxygen content.

3. Method for chlorinating spray-dried magnesium chloride salt according to claim 1 wherein said ferric iron-chloride complex is maintained at said level by periodically adding metallic iron to said molten magnesium chloride salt.

4. Method for chlorinating spray-dried magnesium chloride salt according to claim 1 wherein the carbon and said iron are mixed with said spray-dried magnesium chloride salt prior to melting said salt.

5. Method for chlorinating spray-dried magnesium chloride salt according to claim 1 wherein said magnesium chloride salt is heated to a temperature in the range 1400°–1600°F, and the said ferric-iron-chloride complex is maintained in the salt melt at a level of from 0.5% to as high as 2.0% iron as Fe on a salt weight basis during chlorination of said molten salt.

* * * * *